(12) United States Patent
Suhir

(10) Patent No.: US 6,647,195 B2
(45) Date of Patent: Nov. 11, 2003

(54) COATED OPTICAL GLASS FIBER

(75) Inventor: Ephraim Suhir, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 120 days.

(21) Appl. No.: 09/798,031

(22) Filed: Feb. 28, 2001

(65) Prior Publication Data

US 2002/0164141 A1 Nov. 7, 2002

(51) Int. Cl.$^7$ ............................................... G02B 6/02
(52) U.S. Cl. ....................................................... 385/128
(58) Field of Search ............................. 385/126, 127, 385/128

(56) References Cited

U.S. PATENT DOCUMENTS 5,436,167 A * 7/1995 Robillard ..................... 385/12
6,314,222 B1 * 11/2001 Jang et al. .................. 359/130

OTHER PUBLICATIONS

Suhir, E. "Stresses in a Partially Coated Glass Fiber Subjected to the Ends Off–Set", Journal of Lightwave Technology, vol. 15, No. 11 Nov. 1997, pp 2091–2094.
King, W. W. "Thermomechanical Mechanism for Delamination of Polymer Coatings From Optical Fibers", Journal of Electronic Packaging, Jun. 1997, vol. 119, pp 133–137.
Suhir, E., "Approximate Evaluation of the Interfacial Shearing Stress in Cylindrical Double Lap Shear Joints with Application to Dual–Coated Optical Fibers", Int. Journal of Solids and Structures, vol. 31, No. 23, 1994, pp 3261–3283.
Suhir, E. "Analytical Modeling of the Interfacial Shearing Stress in Dual–Coated Optical Fiber Specimens Subjected to Tension", Applied Optics, vol. 32, No. 16, 1993.
Shiue, S. T., "Thermal Stresses in Tightly Jacketed Double–Coated Optic Fibers at Low Temperatures", Journal of Applied Physics, vol. 76, No. 12, Dec. 15, 1994, pp 7695–7703.
Shiue, S. T., "The Axial Strain–Induced Stresses in Double–Coated Optical Fibers", Journal of the Chinese Institute of Engineers, vol. 17, No. 1. 1994.
Suhir E., "Mechanical Approach to the Evaluation of the Low Temperature Threshold of Added Transmission Losses in Single–Coated Optical Fibers", Journal of Lightwave Technology, vol. 8, No. 6, Jun. 1990, pp 863–868.
Suhir E., "Stresses in Dual–Coated Optical Fibers", ASME Journal of Applied Mechanics, vol. 55, No. 10, Dec. 1988, pp 822–830.
Suhir, E. "Fiber Optics Structural Mechanics–Brief Review", Editor's Note, ASME Journal of Electronic Packaging, vol. 120, Sep., 1998, pp 217–220.
Suhir, E. "Thermal Stress Failures in Microelectronics and Photonics: Prediction and Prevention", Future Circuits International, Issue 5, 1999.
Suhir, E. "Stresses in Bi–Metal Thermostats", ASME Journal of Applied Mechanics, vol. 53, No. 3, Sep., 1986.

* cited by examiner

Primary Examiner—Tulsidas Patel

(57) ABSTRACT

An optical fiber having a multi-material coating and a fabrication method therefor are disclosed. The coating includes at least two portions adjacent in a longitudinal direction. Adjacent portions are comprised of different materials having different Young's moduli. The invention provides a multi-material coating for an optical fiber and coating fabrication method wherein the interfacial shearing stress for the multi-material coated fiber is less than the interfacial shearing stress for a substantially like fiber coated with only one of the materials found in the multi-material coating. Further disclosed is a telecommunications system and fabrication method, wherein the system comprises multi-material coated fibers having reduced interfacial shearing stress.

22 Claims, 3 Drawing Sheets

COATED OPTICAL GLASS FIBER

FIELD OF THE INVENTION

The invention relates to polymer coated optical fibers and, more particularly, to reducing interfacial shearing stress in such fibers.

BACKGROUND OF THE INVENTION

Polymer coatings are widely used on silica optical fibers to improve reliability of the silica material, which is both brittle and moisture-sensitive. Conventional coatings are made of a single polymer material. Although they may enhance the reliability of the silica, they may delaminate therefrom, reducing their effectiveness and possibly damaging the system in which they are used.

Delamination occurs primarily because of dissimilar materials in the coated fiber. Dissimilar materials may cause thermally induced stresses in the polymer-coated optical fiber when the structure is manufactured at an elevated temperature and is subsequently cooled down to a lower temperature. These stresses force the coating apart from the fiber. Coatings having properties, such as coefficients of thermal expansion, that would reduce the thermal stresses, may not provide adequate protection of the silica material. Accordingly, there is a need for an optical fiber coating less susceptible to delamination than conventional coatings, and that adequately protects the optical fiber.

SUMMARY OF THE INVENTION

Thermally induced stresses in coated optical fibers may be reduced by coating portions of the fiber with materials of different Young's moduli, thereby decreasing occurrences of delamination as compared to a fiber with a single material coating.

Embodiments of the invention provide an optical fiber having a multi-material coating and a fabrication method therefor. The coating includes at least two portions adjacent in a longitudinal direction. Adjacent portions are made of different materials having different Young's moduli. In an illustrative embodiment, the coating has two end portions and a mid-portion therebetween. The mid-portion comprises a material different from that of either end portion. Each end portion material has a lower Young's modulus than that of the mid-portion.

The interfacial shearing stress for the multi-material coated fiber can be substantially lower than the interfacial shearing stress for a similar fiber coated with only one of the materials found in the multi-material coating. For example, in an embodiment of a coating having a mid-portion and two end portions, the interfacial shearing stress of the multi-material coated fiber is less than that of a substantially like fiber coated with only the mid-portion material to substantially the same thickness as the multi-material.

Further disclosed is a telecommunications system and fabrication method, wherein the system comprises multi-material coated fibers having reduced interfacial shearing stress.

DESCRIPTION OF THE DRAWINGS

The invention is best understood from the following detailed description when read with the accompanying drawings.

DETAILED DESCRIPTION OF THE INVENTION

Embodiments of the invention include and apply to glass structures having a multi-material coating. Embodiments are particularly applicable to coated optical fibers, and more particularly to polymer coated optical fibers. Accordingly, the invention will be described as it applies to such fibers. Those skilled in the art, however, will understand that embodiments of the invention apply to other multi-material coated structures, and thus, such structures are within the spirit and scope of the invention.

Figure 1:
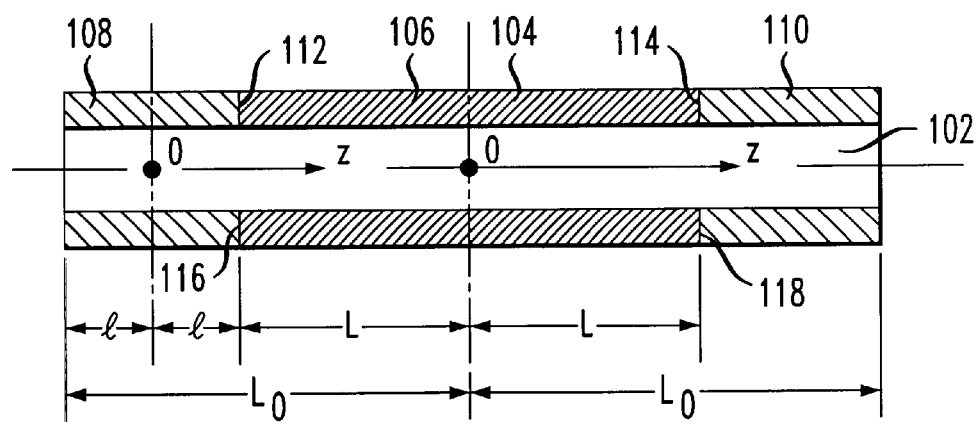
FIG. 1 depicts a multi-material coated optical fiber according to an illustrative embodiment of the invention.

Embodiments of the invention include a coating comprising a given high-modulus polymeric material in the mid-portion of the fiber and of a different low modulus material at the fiber ends. FIG. 1 depicts an optical fiber 102 having a coating 104. The coating 104 comprises a mid-portion 106 having a length 2L, and end portions 108 and 110, each having a length of 2 l. The fiber 102 has a total length $2L_0$. The axial coordinate, z, is shown and will be referenced in the stress-strain analysis that follows. The end portions 108 and 110 are depicted in FIG. 1 as being equal in length to simplify the analytical model described herein. Those skilled in the art will understand that the lengths need not be necessarily equal and that the analytical methods may be applied to such a situation.

Figure 2:
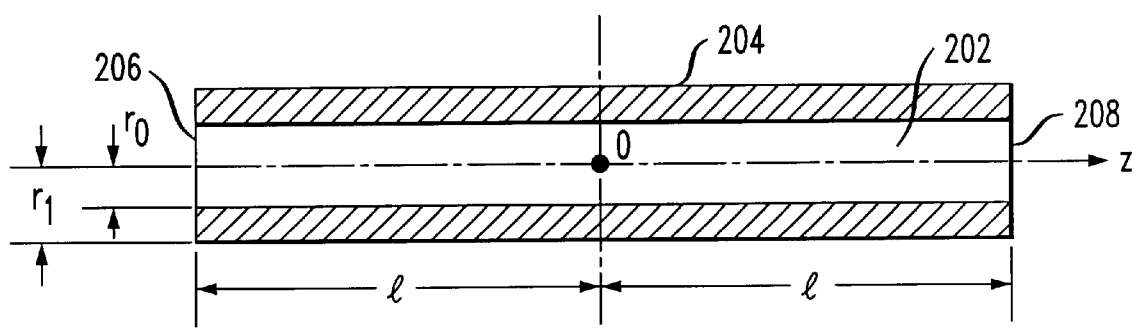
FIG. 2 depicts a prior art polymer-coated optical glass fiber.
Figure 3:
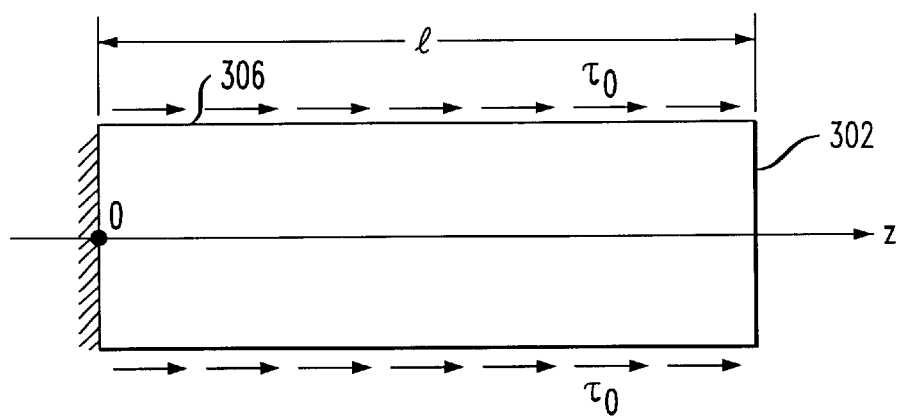
FIG. 3 depicts a solid cylinder subjected to constant longitudinal shear loading.
Figure 4:
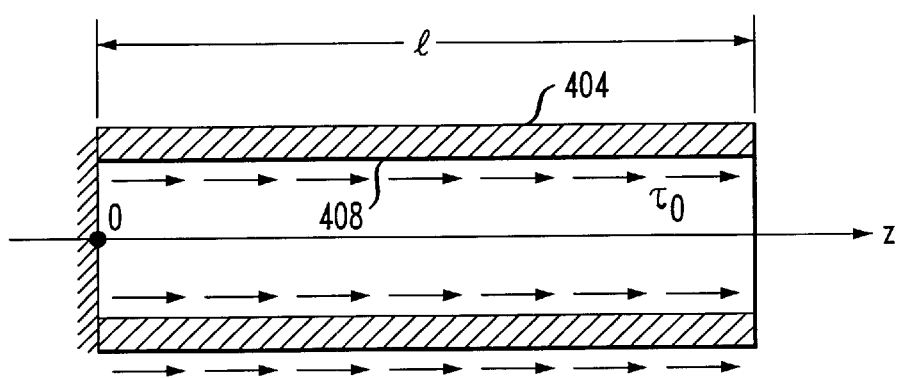
FIG. 4 depicts a hollow cylinder subjected to constant longitudinal shear loading.

Following is an analysis of the stress relief gained by using a bi-material coating in place of a single conventional coating material. The analysis begins with an evaluation of a coated glass fiber subjected to the change in temperature. A basic equation for this situation is first formulated. FIG. 2 depicts a prior art polymer-coated optical glass fiber 202 having a length 2 l and a coating 204. The fiber 202 is manufactured at an elevated temperature and subsequently cooled down to a lower temperature, such as room temperature. In an approximate analysis, the longitudinal interfacial displacements, $u_0(z)$ and $u_1(z)$, of the fiber 202 and the coating 204, respectively, can be evaluated by the formulas:

$$u_0(z) = -\alpha_0 \Delta t z + \lambda_0 \left[ \int_0^z T_0(\zeta)d\zeta - \kappa_0 \tau_0(z) \right] \quad (1)$$

$$u_1(z) = -\alpha_1 \Delta t z - \lambda_1 \int_0^z T_0(\zeta)d\zeta + \kappa_1 \tau_0(z)$$

where $\alpha_0$ and $\alpha_1$ are the coefficients of thermal expansion (CTE) of the glass and the coating material, $\Delta t$ is the change in temperature, $$\lambda_0 = (\pi E_0 r_0^2)^{-1}, \lambda\text{hd } 1 = [\pi E_1 (r_1^2 - r_0^2)]^{-1} \quad (2)$$

are the axial compliances of glass fiber 202 and coating 204, respectively, $E_0$ and $E_1$ are the Young's moduli of the materials, $r_0$ is the radius of the glass fiber 202, $r_1$ is the outer radius of coating 204, $$T_0(z) = 2\pi r_0 \int_{-l}^{z} \tau(\zeta) d\zeta \quad (3)$$

is the low temperature thermally induced force in the glass fiber 202 (in compression) and in the coating 204 (in tension), $\tau_0(z)$ is the interfacial shearing stress, l is half the length of the glass fiber 202, $$\kappa_0 = \frac{r_0}{E_0}, \kappa_1 = \frac{r_0}{2E_1}\left[\frac{4(1+\nu_1)}{1-\gamma^2}\ln\sqrt{\frac{1+\gamma^2}{1-\gamma^2}} - 1\right] \quad (4)$$

are the interfacial compliances of the glass fiber 202 and its coating 204, $\gamma = r_0/r_1$ is the radii ratio, and $\nu_1$ is Poisson's ratio of the coating material. The origin, O of the axial coordinate, z, is in the mid-cross-section of the fiber on its axis. The derivation of the formulas (4) is as follows:

The objective of the analysis, which follows, is to obtain simple formulas for the longitudinal interfacial compliances of a glass fiber (solid cylinder 302) and its coating (hollow cylinder 304), as shown in FIGS. 3 and 4, respectively. FIG. 3 is a stress-strain model for the end-portions of a glass fiber depicted as a solid cylinder subjected to constant longitudinal shear loading. FIG. 4 is a stress-strain model for the end-portions of the coating interaction with glass, depicted as a hollow cylinder subjected to longitudinal shear loading. Formulas (4) are the same as the derived formulas (A-19) and (A-32). The derivation of these formulas is provided by the Equations A-1 through A-33. The derivation is based on the relationships of the axisymmetrical problem of the elasticity theory. The following assumptions are used for the development of these formulas:

The normal radial stress, $\sigma_r$, and the normal tangential (circumferential) stress, $\sigma_t$, are zero everywhere;

The normal axial stress, $\sigma_z$, depends on the axial coordinate, z, only;

The shearing stress, $\tau_{rz}$, depends on the current radius, r, only;

The coefficient of the longitudinal interfacial compliance can be found as the ratio $$\kappa = \frac{\Delta w}{\tau_0} \quad (A-1)$$

of the axial displacement, $\Delta w$, due to the shearing stress, applied to the surface 306 of the glass fiber 302 or to the inner surface 408 of the coating 404, to the magnitude, $\tau_0$, of this stress.

The displacement, $\Delta w$, due to the shearing force can be evaluated as the difference between the longitudinal axial displacement at the cylindrical surface (where the shearing load $\tau_0$ is applied) and the displacement at the axis of the cylinder, in the case when the compliance of the inner cylinder (glass fiber 302) is considered, and at the mid-surface of the cylinder body, in the case when the outer cylinder (coating 404) is examined. The radius of this mid-surface is $$r_m = \sqrt{\frac{r_0^2 + r_1^2}{2}}, \quad (A-2)$$

where $r_0$ is the radius of the glass fiber 302, and $r_1$ is the outer radius of the coating 404.

The following basic equations of the axisymmetric problem of the theory of elasticity are used in the analysis (such as described, for instance, in Suhir, E. "Structural Analysis in Microelectronic and Fiber Optic Systems", vol.1, Basic Principles of Engineering Elasticity and Fundamentals of Structural Analysis", Van Nostrand Reinhold, New York, 1991):

1) Equations of equilibrium:

$$\frac{\partial \sigma_r}{\partial r} + \frac{\sigma_r - \sigma_t}{r} + \frac{\partial \tau_{rz}}{\partial z} = 0, \frac{\partial}{\partial r}(r\tau_{rz}) + r\frac{\partial \sigma_z}{\partial z} = 0 \quad (A-3)$$

2) Hooke's law equations:

$$\varepsilon_r = \frac{1}{E}[\sigma_r - \nu(\sigma_t + \sigma_z)], \varepsilon_t = \frac{1}{E}[\sigma_t - \nu(\sigma_r + \sigma_z)], \quad (A-4)$$
$$\varepsilon_z = \frac{1}{E}[\sigma_z - \nu(\sigma_r + \sigma_t)], \gamma_{rz} = \frac{1}{G}\tau_{rz}$$

where E is Young's modulus of the material, $\nu$ is its Poisson's ratio, $$G = \frac{E}{2(1+\nu)}$$

is the shear modulus of the material: $\epsilon_r$, $\epsilon_t$ and $\epsilon_z$ are the normal strains in the radial, tangential and axial directions, respectively, and $\gamma_{rz}$ is the shearing strain;

3) Cauchy's formulas:

$$\varepsilon_r = \frac{\partial u}{\partial r}, \varepsilon_t = \frac{u}{r}, \varepsilon_z = \frac{\partial w}{\partial z}, \gamma_{rz} = \frac{\partial u}{\partial z} + \frac{\partial w}{\partial r}, \quad (A-5)$$

where u(r,z) and w(r,z) are the displacements in the radial and the axial directions, respectively.

The shearing and the normal (axial) stresses may now be evaluated. With the assumptions taken, the first equation in (A-3) is always fulfilled, and the second equation yields:

$$\frac{1}{r}\frac{d}{dr}(r\tau_{rz}) = -\frac{d\sigma_z}{dz} = C, \quad (A-6)$$

where C is constant. It has to be so, since the expression, containing the shearing stress, and the expression, containing the normal stress, are equal, but depend on different arguments. The solutions to the equations (A-6) are:

$$\tau_{rz}(r) = \frac{C}{2}r - \frac{C_1}{r}, \sigma_z(z) = -Cz + C_2, \quad (A-7)$$

where $C_1$ and $C_2$ are constants of integration.

For a solid cylinder (glass fiber), the stresses and strains can be evaluated, based on the following considerations.

The shearing stress, $\tau_{rz}$, must be finite everywhere, including the center of cylinder 404.

This requirement is fulfilled if $C_1=0$ in the first equation in (A-7). The boundary condition $\tau_{rz}(r_0)=\tau_0$ yields:

$$C = 2\frac{\tau_0}{r_0}, \qquad (A-8)$$

so that, based on the first solution in (A-7), the shearing stress can be evaluated as $$\tau_{rz}(r) = \tau_0 \frac{r}{r_0}, \qquad (A-9)$$

and the constant $C_2$ is $$C_2 = \sigma_z(0) = \frac{2\pi r_o l \tau_0}{\pi r_0^2} = 2\frac{l}{r_0}\tau_0, \qquad (A-10)$$

where l is the length of fiber 302. Then the second condition in (A-7) yields:

$$\sigma_z(z) = 2\tau_0 \frac{l-z}{r_0}. \qquad (A-11)$$

Introducing the formulas (A-9) and (A-11) into Cauchy's formulas (A-5), and taking into account that, in accordance with the taken assumptions, the normal radial and the normal tangential stresses are zero everywhere ($\sigma_r=\sigma_t=0$), we obtain the following formulas for the strains:

$$\varepsilon_r = \varepsilon_t = -\frac{v}{E}\sigma_z = -2v\frac{\tau_0}{E}\frac{l-z}{r_0}, \; \varepsilon_z = \frac{\sigma_z}{E} = 2\frac{\tau_0}{E}\frac{l-z}{r_0}, \; \gamma_{rz} = \frac{\tau_0}{G}\frac{r}{r_0}. \qquad (A-12)$$

The first formula in (A-12), considering the first two formulas in (A-5), yields:

$$u(r, z) = -2v\frac{\tau_0}{E}\frac{l-z}{r_0}r \qquad (A-13)$$

From the third formula in (A-12), considering the third formula in (A-5), we obtain:

$$w(r, z) = \frac{\tau_0}{E r_0}(2lz - z^2) + f(r), \qquad (A-14)$$

where f(r) is thus far an arbitrary function of the current radius r. Introducing the expressions (A-13) and (A-14) into the last formula in (A-5), and considering the last formula in (A-12), we have:

$$f'(r) = 2\frac{\tau_0}{E}\frac{r}{r_0}, \qquad (A-15)$$

so that $$f(r) = \frac{\tau_0}{E}\frac{r^2}{r_0} + C_3, \qquad (A-16)$$

where the constant $C_3$ of integration determines the displacements of the cylinder 404 as a rigid nondeformable body.

The formulas (A-14) and (A-16) result in the following expression for the axial displacement:

$$w(r, z) = \frac{\tau_0}{E r_0}(r^2 - z^2 + 2lz) + C_3. \qquad (A-17)$$

The sought difference in the axial displacements at the surface of the cylinder and at its axis is $$\Delta w = w(r_0, z) - w(0, z) = \frac{\tau_0}{E}r_0, \qquad (A-18)$$

so that the coefficient of the longitudinal interfacial compliance of the solid cylinder 404 in question can be found as $$\kappa = \frac{\Delta w}{\tau_0} = \frac{r_0}{E}. \qquad (A-19)$$

Stresses and strains for the case of a hollow cylinder coating can then be found based on the following analysis: Introducing the first formula in (A-7) into the boundary conditions for the shearing stress $$\tau_{rz}(r_0)=-\tau_0, \; \tau_{rz}(r_1)=0 \qquad (A-20)$$

The following is obtain:

$$C = \frac{2r_o\tau_0}{r_1^2 - r_0^2}, \; C_1 = \frac{r_o r_1^2 \tau_0}{r_1^2 - r_0^2}, \qquad (A-21)$$

and the formula (A-7) yields:

$$\tau_{rz}(r) = \frac{r_o \tau_0}{r_1^2 - r_0^2}\left(\frac{r_1^2}{r} - r\right). \qquad (A-22)$$

The constant $C_2$ in the solution for the stress $\sigma_z(z)$ in the second formula in (A-7) can be found as $$C_2 = \sigma_z(0) = \frac{2\pi r_0 \tau_0 l}{\pi(r_1^2 - r_0^2)} = 2\frac{r_0 l}{r_1^2 - r_0^2}\tau_0, \qquad (A-23)$$

so that the normal axial stress is expressed by the formula:

$$\sigma_z(z) = 2\frac{r_0 \tau_0}{r_1^2 - r_0^2}(l - z). \qquad (A-24)$$

Then the Hooke's law equations (A-4) result in the following formulas for the strains:

$$\left.\begin{array}{l}\varepsilon_r = \varepsilon_z = -\dfrac{v}{E}\sigma_z = -2v\dfrac{\tau_0}{E}\dfrac{r_0(l-z)}{r_1^2 - r_0^2}\\[4pt] \varepsilon_z = \dfrac{\sigma_z}{E} = 2\dfrac{\tau_0}{E}\dfrac{r_0(l-z)}{r_1^2 - r_0^2}\\[4pt] \gamma_{rz} = \dfrac{\tau_{rz}}{G} = -\dfrac{\tau_0}{G}\dfrac{r_0}{r_1^2 - r_0^2}\left(\dfrac{r_1^2}{r} - r\right)\end{array}\right\}. \qquad (A-25)$$

With the expressions (A-25), the formulas (A-12) yield:

$$u(r, z) = -2v\frac{\tau_0}{E}\frac{r_0 r}{r_1^2 - r_0^2}(l - z), \qquad (A-26)$$

$$w(r, z) = \frac{\tau_0}{E} \frac{r_0}{r_1^2 - r_0^2} z(2l - z) + f_1(r), \quad \text{(A-27)}$$

where $f_1(r)$ is thus far an arbitrary function for the current radius r. Introducing the formulas (A-26) and (A-27) into the last formula in (A-5), we conclude that the function $f_1(r)$ can be found from the equation:

$$f_1'(r) = -2\frac{\tau_0}{E} \frac{r_0}{r_1^2 - r_0^2}\left[(1+v)\frac{r_1^2}{r} - r\right], \quad \text{(A-28)}$$

and therefore $$f_1(r) = -\frac{\tau_0}{E} \frac{r_0}{r_1^2 - r_0^2}[2(1+v)r_1^2 \ln r - r^2] + C_3, \quad \text{(A-29)}$$

and the formula (A-27) results in the following expression for the axial displacement w(r,z):

$$w(r, z) = \frac{\tau_0}{E} \frac{r_0}{r_1^2 - r_0^2}[r^2 - z^2 - 2(1+v)r_1^2 \ln r + 2lz] + C_3. \quad \text{(A-30)}$$

The difference in the axial displacements is $$\Delta w = \frac{\tau_0}{E} \frac{r_0}{r_1^2 - r_0^2}\left[2(1+v)r_1^2 \ln \frac{r_m}{r_0} + r_0^2 - r_m^2\right] = \quad \text{(A-31)}$$

$$= \frac{\tau_0 r_0}{2E}\left[4(1+v)\frac{r_1^2}{r_1^2 - r_0^2}\ln\sqrt{\frac{r_0^2 + r_1^2}{r_1^2 - r_0^2}} - 1\right]$$

The sought coefficient of compliance is $$\kappa = \frac{\Delta w}{\tau_0} = \frac{r_0}{2E}\left[\frac{4(1+v)}{1 - r_0^2/r_1^2}\ln\sqrt{\frac{1 + r_0^2/r_1^2}{1 - r_0^2/r_1^2}} - 1\right]. \quad \text{(A-32)}$$

For very thin cylinders (coatings 404) this formula can be simplified:

$$\kappa = \frac{1 + 2v}{2}\frac{r_0}{E}. \quad \text{(A-33)}$$

Thus, the longitudinal interfacial compliances of the glass and its coating have been determined. The analysis now returns to that following the Equation 4. The first terms in the right parts of the formulas (1) are the unrestricted (stress-free) displacements. The second terms are the thermally induced displacements. They are due to the dissimilar materials in the coated fiber and are calculated on the basis of Hooke's law, assuming that all the cross-sections of the fiber 202 and the coating 204 remain planar despite the temperature induced deformations. The third terms are corrections, which account, in an approximate fashion, for the fact that the longitudinal interfacial displacements are somewhat larger than the longitudinal displacements of the inner points of the cross-section. These corrections reflect an assumption that the deviations of the interfacial surface from planarity are proportional to the shearing stress in the given cross-section and are not affected by the stresses and strains in the adjacent cross-sections.

The condition, $u_0(z) = u_1(z)$, of the compatibility of the interfacial displacements leads to the following equation for the interfacial shearing stress, $\tau_0(z)$:

$$\kappa \tau_0(z) - \lambda \int_0^z T_0(\zeta)\,d\zeta = \Delta \alpha \Delta t z, \quad \text{(5)}$$

where $$\kappa = \kappa_0 + \kappa_1, \quad \lambda = \lambda_0 + \lambda_1 \quad \text{(6)}$$

are the total interfacial and the total axial compliances, respectively, of the coated fiber, and $\Delta\alpha = \alpha_1 - \alpha_0$ is the difference in the CTE of the coating and the glass materials.

Since there are no external axial forces, applied to the fiber ends 206 and 208, the thermally induced force $T_0(z)$ should satisfy the following boundary condition:

$$T_0(\pm l) = 0 \quad \text{(7)}$$

The solution to the equation (5) can be sought in the form:

$$T_0(z) = C_0 + C_1 \cos h\, kz, \quad \text{(8)}$$

where $C_0$ and $C_1$ are constants of integration, and k is thus far unknown parameter of the shearing stress. The condition (7) yields:

$$C_0 = -C_1 \cos h\, kl, \quad \text{(9)}$$

so that $$T_0(z) = -C_1(\cosh kl - \cos h\, kz) \quad \text{(10)}$$

Equations (3) and (10) yield, by differentiation:

$$\tau_0(z) = \frac{T_0'(z)}{2\pi r_0} = C_1 \frac{k}{2\pi r_0}\sinh kz. \quad \text{(11)}$$

Introducing the formulas (10) and (11) into the equation (5) and carrying out the integration, it is concluded that this equation will be fulfilled, if the constant $C_1$, and the parameter k are expressed by the formulas:

$$C_1 = \frac{\Delta\alpha\Delta t}{\lambda \cosh kl}, \quad k = \sqrt{2\pi r_0 \frac{\lambda}{\kappa}}. \quad \text{(12)}$$

With the formulas (12), the solution (10) results in the following expression for the thermally induced force, $T_0(z)$:

$$T_0(z) = -\frac{\Delta\alpha\Delta t}{\lambda}\left(1 - \frac{\cosh kz}{\cosh kl}\right) \quad \text{(13)}$$

The interfacial shearing stress and the corresponding displacement are then determined as follows:

Introducing the expression (13) into the formula (11), the following expression for the interfacial shearing stress is obtained:

$$\tau_0(z) = k\frac{\Delta\alpha\Delta t}{2\pi r_0 \lambda}\sinh\frac{kz}{\sinh kl} \quad \text{(14)}$$

The corresponding longitudinal displacement can be found, considering the second formula in (12), as follows:

$$u(z) = \kappa\tau_0(z) = \frac{\Delta\alpha\Delta t}{k}\frac{\sinh kz}{\sinh kl}. \tag{15}$$

The maximum interfacial shearing stress and the maximum longitudinal displacement occur at the fiber ends 206 and 208:

$$\tau_{max} = k\frac{\Delta\alpha\Delta t}{2\pi r_0\lambda}\tanh kl, \tag{16}$$

$$u_{max} = u(\pm l) = \pm\frac{\Delta\alpha\Delta t}{k}\tanh kl. \tag{17}$$

As evident from the formulas (15) and (16), the maximum shearing stress and the maximum displacement become fiber length independent, if this length is sufficiently large (for example, if the product kl is larger than 2.5), so that tanh kl can be assumed equal to one.

Figure 5:
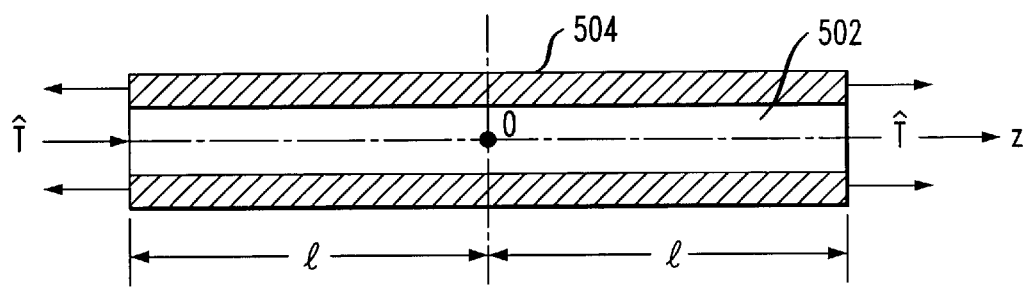
FIG. 5 depicts a glass fiber having a coating and subjected to a symmetric external shear loading.

The analysis continues by evaluating coated glass fiber subjected to external shear loading. First, the situation of symmetric loading is analyzed. FIG. 5 is a stress-strain model for the mid-portion of a coating. It depicts a glass fiber 502 having a coating 504 and subject to a symmetric external loading $\hat{T}$. In this case, the formula (8) for the thermally induced axial force and the boundary condition $$T_0(\pm l) = -\hat{T}, \tag{18}$$

yield:

$$C_0 = -\hat{T} - C_1 \cos h\, kl \tag{19}$$

Then the formula (8) results in the following expression for the axial force:

$$T_0(z) = \hat{T} - C_1(\cos h\, kl - \cos h\, kz). \tag{20}$$

As to the constant $C_1$, it can be found from the equation:

$$\kappa\tau_0(z) - \lambda\int_0^z T_0(\zeta)d\zeta = 0. \tag{21}$$

This equation follows from the basic integral equation (5), in which the thermally induced strain, $\Delta\alpha\Delta t$, is set equal to zero.

Introducing the formulas (19) and (11) into the equation (21), it is concluded that the parameter k is expressed by the second formula in (12), and the constant $C_1$ of integration is expressed as:

$$C_1 = -\frac{\hat{T}}{\cosh kl}. \tag{22}$$

With this $C_1$ value, the formulas (20) and (11) result in the following expressions for the axial force, $T_0(z)$, and the interfacial shearing stress, $\tau_0(z)$:

$$T_0(z) = -\hat{T}\frac{\cosh kz}{\cosh kl},\; \tau_0(z) = \frac{dT_0(z)}{dz} = -\frac{k\hat{T}}{2\pi r_0}\frac{\sinh kz}{\sinh kl}. \tag{23}$$

The maximum interfacial shearing stress and the corresponding displacement are as follows:

$$\tau_{max} = \tau(\pm l) = \pm\frac{k\hat{T}}{2\pi r_0}\tanh kl, \tag{24}$$

$$u_{max} = \kappa\tau_{max} = \pm\frac{\lambda\hat{T}}{k}\tanh kl. \tag{25}$$

Figure 6:
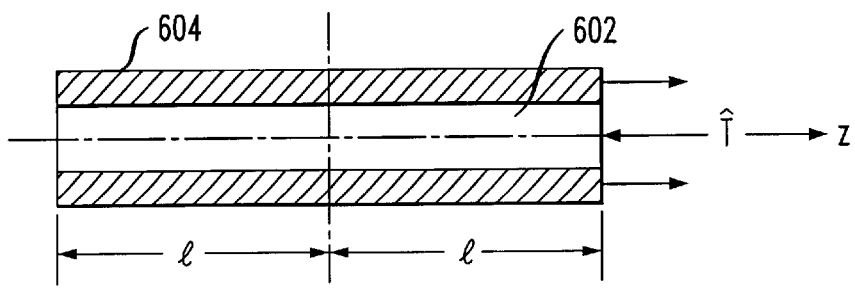
FIG. 6 depicts a glass fiber with a coating subjected to external asymmetric shear loading.

Now the case of an asymmetric loading is examined. FIG. 6 is a stress-strain model for the end-portions of the coating. It depicts a glass fiber 602 with a coating 604 subject to asymmetric loading. In this case, the boundary conditions for the axial force $T_0(z)$ are:

$$T_0(-l) = 0,\; T_0(l) = -\hat{T}, \tag{26}$$

and the solution to the equation (21) can be sought in the form $$T_0(z) = \bar{C}_1 \cos h\, kz + \bar{C}_2 \sin h\, kz, \tag{27}$$

where $\bar{C}_1$ and $\bar{C}_2$ are constants of integration. The conditions (26) yield:

$$\bar{C}_1 = -\frac{\hat{T}}{2\cosh kl},\; \bar{C}_2 = -\frac{\hat{T}}{2\sinh kl}, \tag{28}$$

so that $$T_0(z) = -\hat{T}\frac{\sinh[k(l+z)]}{\sinh 2kl}, \tag{29}$$

and the formula (11) results in the following expression for the shearing stress:

$$\tau_0(z) = -\frac{k}{2\pi r_0}\hat{T}\frac{\cosh[k(l+z)]}{\sinh 2kl}. \tag{30}$$

The interfacial shearing stresses and the corresponding displacements at the assembly ends are as follows:

$$\tau_0(-l) = -\frac{k\hat{T}}{2\pi r_0}\frac{1}{\sinh 2kl},\; u_0(-l) = -\frac{\lambda\hat{T}}{k}\frac{1}{\sinh 2kl}, \tag{31}$$

$$\tau_0(l) = -\frac{k\hat{T}}{2\pi r_0}\cotanh 2kl,\; u_0(l) = -\frac{\lambda\hat{T}}{k}\cotanh 2kl. \tag{32}$$

The force at the boundary of the coating layers is now defined. The thermally induced force, $\hat{T}$, at the boundary between dissimilar coating materials can be determined, based on the condition of compatibility, $u_m = u_p$, of the displacement $$u_m = -\frac{\Delta\alpha_m\Delta t}{k_m}\tanh k_m L - \frac{\lambda_m}{k_m}\hat{T}\tanh k_m L \tag{33}$$

at a mid-portion end 112 or 114 of the coating (FIG. 1) 104 and the displacement $$u_p = \frac{\Delta\alpha_p\Delta t}{k_p}\tanh k_p l + \frac{\lambda_p}{k_p}\hat{T}\cotanh 2k_p l \tag{34}$$

at an inner end 116 or 118 of the peripheral portion 108 or 110 (FIG. 1). The formula (33) follows from the formulas

(17) and (25), and the formula (34) is obtained, based on the formula (17) and the second formula in (32). The subscripts "m" and "p" indicate that the corresponding values are computed for the mid-portion 106 and the peripheral portions 108, 110 of the coating, respectively.

Equating the expressions (33) and (34), so that the displacement compatibility condition is fulfilled, and solving the obtained equation for the $\hat{T}$ value, the following formula is obtained for the thermally induced force $\hat{T}$ at the boundary between the dissimilar coating materials:

$$\hat{T} = \frac{\frac{\Delta\alpha_m}{k_m}\tanh k_m L + \frac{\Delta\alpha_p}{k_p}\tanh k_p l}{\frac{\lambda_m}{k_m}\tanh k_m L + \frac{\lambda_p}{k_p}\cotanh 2k_p l}\Delta t \quad (35)$$

The interfacial shearing stress in the mid-portion 106 can be evaluated, based on the formula (14) and the second formula in (23), as follows:

$$\tau_m(z) = \frac{k_m}{2\pi r_0}\left(\frac{\Delta\alpha_m \Delta t}{\lambda_m} - \hat{T}\right)\frac{\sinh k_m z}{\cosh k_m L} \quad (36)$$

The interfacial shearing stress in the peripheral portions 108, 110 can be found on the basis of the formulas (14) and (30):

$$\tau_p(z) = \frac{k_p}{2\pi r_0}\left(\frac{\Delta\alpha_p \Delta t}{\lambda_p}\frac{\sinh k_p z}{\cosh k_p L} - \hat{T}\frac{\cosh[k_p(l+z)]}{\sinh 2k_p L}\right). \quad (37)$$

The maximum interfacing shearing stress in the mid-portion 106 occurs at the ends 112, 114 of mid-portion 106 (z=±L):

$$\tau_m(L) = -\tau_m(-L) = \frac{k_m}{2\pi r_0}\left(\frac{\Delta\alpha_m \Delta t}{\lambda_m} - \hat{T}\right)\tanh k_m L \quad (38)$$

The interfacial shearing stress at the ends z±l of the peripheral portions 108, 110 are $$\tau_p(l) = \frac{k_p}{2\pi r_0}\left(\frac{\Delta\alpha_p \Delta t}{\lambda_p}\tanh k_p l - \hat{T}\cotanh 2k_p l\right) \quad (39)$$

$$\tau_p(-l) = -\frac{k_p}{2\pi r_0}\left(\frac{\Delta\alpha_p \Delta t}{\lambda_p}\tanh k_p l + \hat{T}\frac{1}{\sinh 2k_p l}\right) \quad (40)$$

The important special case wherein both the mid-portion and the peripheral portions of the coating are long ($k_m L \geq 2.5$ and $k_p l \geq 2.5$) is now examined. In this case, when the mid-portion 106 and the peripheral portions 108, 110 of the coating are long, the formulas (35), (38), (39), and (40) yield:

$$\hat{T} = \frac{\frac{\Delta\alpha_m}{k_m} + \frac{\Delta\alpha_p}{k_p}}{\frac{\lambda_m}{k_m} + \frac{\lambda_p}{k_p}}\Delta t = \frac{k_p \Delta\alpha_m + k_m \Delta\alpha_p}{k_p \lambda_m + k_m \lambda_p}\Delta t \quad (41)$$

$$\tau_m(-L) = -\frac{k_m}{2\pi r_0}\left(\frac{\Delta\alpha_m \Delta t}{\lambda_m} - \hat{T}\right) = -\frac{\lambda_p \Delta\alpha_m - \lambda_m \Delta\alpha_p}{\kappa_m(k_p \lambda_m + k_m \lambda_p)}\Delta t \quad (42)$$

-continued $$\tau_p(l) = \frac{k_p}{2\pi r_0}\left(\frac{\Delta\alpha_p \Delta t}{\lambda_p} - \hat{T}\right) = -\frac{\lambda_p \Delta\alpha_m - \lambda_m \Delta\alpha_p}{\kappa_p(k_p \lambda_m + k_m \lambda_p)}\Delta t \quad (43)$$

$$\tau_p(-l) = -\frac{k_p}{2\pi r_0}\frac{\Delta\alpha_p \Delta t}{\lambda_p} = -\frac{\Delta\alpha_p \Delta t}{\kappa_p k_p} \quad (44)$$

In a situation, when a low modulus coating is used in the peripheral portions 108, 110, the stresses $\tau_m(-L)$ and $\tau_m(L)$ in the mid-portion 106, at its boundaries 116, 118 with peripheral portions 108, 110, are higher than the stresses $\tau_p(l)$ in the peripheral portions 108, 110 at the same boundary. If a requirement is imposed that the stress $\tau_m(-L)$ be equal to the stress $\tau_p(-l)$ at the free edge of a peripheral portion 108, 110 (structural optimization approach), then the following relationship between the coefficients of thermal expansion of the coating material at the mid-portion 106 and the peripheral portions 108, 110 should be fulfilled:

$$\Delta\alpha_p = \frac{\frac{\lambda_p}{\lambda_m}}{\frac{k_m^2}{k_p^2}\frac{\lambda_m}{\lambda_p} + \frac{k_p}{k_m} + 1}\Delta\alpha_m. \quad (45)$$

Then, these stresses can be evaluated as $$\tau_m(-L) = \tau_p(-l) = -k_m \frac{\Delta\alpha_m \Delta t}{2\pi r_0 \lambda_m}\chi, \quad (46)$$

where the factor $$\chi = \chi\left(\frac{k_m}{k_p}, \frac{\lambda_p}{\lambda_m}\right) = \frac{\frac{k_p}{k_m}}{\frac{k_p^2}{k_m^2}\frac{\lambda_m}{\lambda_p} + \frac{k_p}{k_m} + 1} = \frac{k_p/k_m}{\lambda_p/\lambda_m}\frac{\Delta\alpha_p}{\Delta\alpha_m} \quad (47)$$

considers the effect of the low modulus coating at the fiber ends on the maximum value of the interfacial shearing stress. Because $$\frac{\lambda_m}{\lambda_p} = \frac{\bar{E}_m 1 + \bar{E}_p(1-\gamma^2)}{\bar{E}_p 1 + \bar{E}_m(1-\gamma^2)}, \bar{E}_m = \frac{E_m}{E_0}, \bar{E}_p = \frac{E_p}{E_0}, \quad (48)$$

and $$\frac{k_p}{k_m} = \sqrt{\frac{1+\bar{E}_p(1-\gamma^2)}{1+\bar{E}_m(1-\gamma^2)}}\frac{2\bar{E}_m - 1 + \frac{4(1+\nu_m)}{1-\gamma^2}\ln\sqrt{\frac{1+\gamma^2}{1-\gamma^2}}}{2\bar{E}_p - 1 + \frac{4(1+\nu_p)}{1-\gamma^2}\ln\sqrt{\frac{1+\gamma^2}{1-\gamma^2}}}, \quad (49)$$

the factor $\chi$ can be expressed, for the given radii ratio, $\gamma$, and the given Poisson's ratios, $\nu_m$, and $\nu_p$, through the Young's moduli ratios $\bar{E}_m$ and $\bar{E}_p$.

Following are numerical examples. The analyses provided in these examples are illustrative embodiments of the invention.

NUMERICAL EXAMPLES

Example 1

Let a glass fiber ($E_0=10^7$ psi=7032.35 kgf/mm²; $\alpha_0=0.5\times 10^{-6}$ 1/° C.; $r_0=0.0625$ mm) be coated with a "conventional"

(high modulus/low CTE) polymer material ($E_1=10^6$ psi= 703.235 kgf/mm$^2$; $v_1=0.4$; $\alpha_1=20.5\times10^{-6}$ 1/° C.; $r_1=0.1250$ mm; $\gamma=r_0/r_1=0.5$) in its mid-portion and with a low-modulus/high-CTE material ($E_1=10^5$ psi=70.3235 kgf/mm$^2$; $v_1=0.4$; $\alpha_1=61.5\times10^{-6}$/° C.; $r_1=0.1250$ mm; $\gamma=r_0/r_1=0.5$) at the ends. We examine the case, when the coated portions are long enough ($k_mL \geq 2.5$ and $k_pl \geq 2.5$), so that the formulas 41–48 apply. The drop in temperature is $\Delta t=100°$ C. The calculated thermally induced force at the boundary of the dissimilar coating materials is $\hat{T}=0.0180$ kgf, and the predicted interfacial shearing stresses are:

at the ends of the mid-portion: $\tau_m(-L)=-1.1124$ kgf/mm$^2$;
at the inner ends of the peripheral portions: $\tau_p(l)=-0.1328$ kgf/mm$^2$;
at the outer ends of the peripheral portions: $\tau_p(-l)=-0.7603$ kgf/mm$^2$;

If only the "conventional" (high modulus) coating were employed throughout the fiber, the predicted shearing stresses at the fiber edges would be $\tau_{max}=-2.0306$ kgf/mm$^2$. By comparing the highest interfacial shearing stress value for the bi-material structure ($-1.1124$ kgf/mm$^2$) to that for a "conventional" coated fiber, it is concluded that the stress relief due to the application of the low modulus coating at the fiber ends is as high as 45.2%.

Example 2

In the example 1, the shearing stress $\tau_m(-L)=-1.1124$ kgf/mm$^2$ at the ends of the coating in the mid-portion of the fiber is higher than the stress $\tau_p(-l)=-0.7603$ kgf/mm$^2$ at the fiber ends. If one requires that the stresses at these locations be equal, then, as follows from the formula (45), a low modulus material with the thermal mismatch of $\Delta\alpha_p=75.7431\times10^{-6}$ 1/° C. with the glass should be used. The corresponding coefficient of thermal expansion (CTE) of this material is $\alpha_p=76.2431\times10^{-6}$ 1/° C., i.e. appreciably higher than the CTE value $\alpha_p=61.0\times10^{-6}$ 1/° C., used in the original calculation. With such a coating material, the factor $\chi$, reflecting the effect of the low modulus coating on the maximum interfacial shearing stress and determined by the formula (47), is as low as $\chi=0.4649$, and the maximum predicted interfacial shearing stress is only $\tau_m(-L)=\tau_p(-l)=-0.9441$ kgf/mm. Hence, in such an optimized case stress relief as high as 53.5% could be achieved.

Example 3

As is known, low modulus polymeric materials are typically characterized by higher coefficients of thermal expansion (contraction). In a hypothetical situation, when the CTE of the low modulus material at the fiber ends is the same as the CTE of the "high" modulus material in the mid-portion of the fiber, in the above example the calculated force at the boundary of the dissimilar coating materials is $\hat{T}=0.0088328$ kgf, and the predicted interfacial shearing stresses at the ends of the mid-portion, at the inner ends of the peripheral portions, and at the ends of the coated fiber are $\tau_m(-L)=-1.5803$ kgf/mm$^2$, $\tau_p(l)=-0.1887$ kgf/mm and $\tau_p(-l)=-0.2493$ kgf/mm$^2$, respectively. Hence, low CTE of the low modulus material at the peripheral portions of the fiber resulted in lower interfacial shearing stresses at the fiber ends, but led to higher shearing stresses at the ends of the fiber mid-portion. Thus, in the case in question, (i.e. in a typical situation) higher CTE of low modulus coating had a favorable effect on the maximum interfacial shearing stress.

Thus, the analytical model contained herein may be used to evaluate the thermally induced interfacial shearing stresses in an optical glass fiber, coated with a "conventional" (high modulus) polymer in its mid-portion and with a low modulus polymer at the ends. The calculated data show that there is a definite incentive for employing a bi-material coating system of the type in question for lower maximum interfacial shearing stresses. The developed formulas can be used to design such a coating system and to predict the relief in the level of the maximum interfacial shearing stress.

In a broad embodiment of the invention, an optical fiber has a coating comprising at least two portions adjacent in a longitudinal direction. Adjacent portions are comprised of different materials having different Young's moduli. Typically, the materials will also have differing coefficients of thermal expansion. The materials are preferably polymeric, and preferably have coefficients of thermal expansion in a range of about $3\times10^{-5}$° $C.^{-1}$ to about $9\times10^{-5}$° $C.^{-1}$.

In an illustrative embodiment, the coating has two end portions and a mid-portion there between, such as depicted in FIG. 1. The mid-portion comprises a material different from that of either end portion. Each end portion material has a lower Young's modulus than that of the mid-portion. In an exemplary embodiment, the end portion material has a higher coefficient of thermal expansion than the mid-portion. A further illustrative embodiment of a multi-material coated fiber comprises a coating having a mid-portion and a plurality of adjacent end portions.

Embodiments of the invention provide a multi-material coated fiber and fabrication method wherein the interfacial shearing stress is less than, and may be substantially less than, the interfacial shearing stress for a similar or substantially like fiber coated with only one of the materials found in the multi-material coating. For example, in the embodiment described above having a mid-portion and two end portions as depicted in FIG. 1, the interfacial shearing stress of the multi-material coated fiber is less than, and may be considerably lower than, that of a similar or substantially like fiber coated with only the mid-portion material to substantially the same thickness as the multi-material.

The multi-material interfacial shearing stress can be calculated from the Equations 42–44, which can be expressed generally as:

$$\tau = \frac{k}{2\pi r_o}\left(\frac{\alpha\Delta t}{\lambda} - \hat{T}\right)$$

wherein k is defined by the Equation 12. These equations are particularly applicable to cases wherein the mid-portion and end portions are long, as described above.

To provide the desired interfacial shearing stress the coatings may be selected to satisfy the following equation:

$$\left[\frac{k}{2\pi r_o}\left(\frac{\alpha\Delta t}{\lambda} - \hat{T}\right)\right]_{multi\text{-}material} < \left[\frac{k}{2\pi r_o}\left(\frac{\alpha\Delta t}{\lambda} - \hat{T}\right)\right]_{single\ material}$$

wherein the bracketed term of the left side of the equation is the interfacial shearing stress of the multi-material coating and the bracketed term on the right side of the equation is the interfacial shearing stress of a single material coating.

Significant interfacial shearing stress relief can be achieved by employing the multi-material coating as compared to a coating comprising only the mid-portion material, wherein both coatings are applied to substantially the same thickness and to substantially like fibers. An illustrative range of stress relief is about 40% to about 60%.

It is desirable to fabricate the multi-material coating from materials having similar curing temperatures. Preferably any two materials of the multi-material coating have curing temperatures differing less than about 25° C. Materials may, however, have any curing temperatures for which a fabrication method will allow them to be applied as adjacent coating materials.

In an exemplary embodiment of the invention at least one material of the multi-material coating is a polymeric material with the Young's moduli of about $E=0.2\times10^6$ psi or higher, and at least one material is a polymeric material with the Young's moduli of about $E=0.1\times10^6$ psi or lower. In an exemplary embodiment of a coating having a mid-portion and two end portions, the mid-portion of the coating comprises a material from the first group and the end portion comprises a material from the latter group. In a further embodiment, a first portion of the coating has a Young's modulus in the range of about $0.2\times10^6$ psi to about $0.4\times10^6$ psi and a second portion has a Young's modulus in the range of about $0.02\times10^6$ psi to about $0.04\times10^6$ psi.

The degree to which coatings of the invention will reduce interfacial shearing stress will vary according to factors such as the combination of materials selected. An illustrative range of interfacial shearing stress achieved is about 1.50 kgf/mmn$^2$ to about 0.50 kgf/mm$^2$.

Further disclosed is a telecommunications system and fabrication method comprising one or more multi-material coated optical fibers manufactured according to embodiments of the invention described herein.

While the invention has been described by illustrative embodiments, additional advantages and modifications will occur to those skilled in the art. Therefore, the invention in its broader aspects is not limited to specific details shown and described herein. Modifications, for example to the type of coating material, length ratio of coatings to one another and interfacial shearing stress calculations, may be made without departing from the spirit and scope of the invention. Accordingly, it is intended that the invention not be limited to the specific illustrative embodiments but be interpreted within the full spirit and scope of the appended claims and their equivalents.

What is claimed is:

1. A multi-material coated optical fiber, the coating having at least two portions adjacent in a longitudinal direction, wherein adjacent portions are comprised of different materials having different Young's moduli, wherein the interfacial shearing stress for the multi-material coated fiber is less than the interfacial shearing stress for a substantially like fiber coated with only one of the material of the multi-material coated fiber.

2. The multi-material coated optical fiber of claim 1 wherein the coating has two end portions and a mid-portion therebetween, the mid-portion comprising a material different from that of the end portions, and wherein each end portion has a lower Young's modulus than that of the mid-portion.

3. The multi-material coated optical fiber of claim 1 wherein the materials satisfy the following equation:

$$\left[\frac{k}{2\pi r_o}\left(\frac{\alpha\Delta t}{\lambda}-\hat{T}\right)\right]_{multi\text{-}material} < \left[\frac{k}{2\pi r_o}\left(\frac{\alpha\Delta t}{\lambda}-\hat{T}\right)\right]_{single\ material}$$

wherein $$k = \sqrt{2\pi r_o \frac{\lambda}{\kappa}},$$

$\alpha$ is the coefficient of thermal expansion, $\Delta t$ is the temperature change, $\lambda$ is the axial compliance of the coating material, $\kappa$ is the coefficient of longitudinal interfacial compliance, $r_0$ is the radius of the optical fiber, $\hat{T}$ is the thermally induced force at a boundary of dissimilar coating materials and the bracketed quantities are the interfacial shearing stresses.

4. The multi-material coated optical fiber of claim 1 wherein the percent interfacial shearing stress relief gained by employing the multi-material coating as compared to a coating comprising only one of the materials of the multi-material coated fiber, wherein both coatings are applied to substantially the same thickness and to substantially like fibers, is in the range of about 40% to about 60%.

5. The multi-material coated optical fiber of claim 1 wherein the difference in curing temperature between any two materials of the multi-material coating is less than about 25° C.

6. The multi-material coated optical fiber of claim 1 wherein the Young's modulus of a first coating portion is in the range of about $0.2\times10^6$ psi to about $1.0\times10^6$ psi, and the Young's modulus of a second adjacent portion is in the range of about $0.02\times10^6$ psi to about $0.1\times10^6$ psi.

7. The multi-material coated optical fiber of claim 1 wherein at least one material is a polymeric material with the Young's moduli of about $0.2\times10^6$ psi or higher, and an adjacent portion material is a polymeric material with the Young's moduli of about $0.1\times10^6$ psi or lower.

8. The multi-material coated optical fiber of claim 2 wherein the mid-portion material is a polymeric material with the Young's moduli of about $0.2\times10^6$ psi or higher.

9. The multi-material coated optical fiber of claim 2 wherein at least one material is a polymeric material with the Young's moduli of about $0.1\times10^6$ psi or lower.

10. The multi-material coated optical fiber of claim 1 wherein the interfacial shearing stress is in the range of about 0.5 kgf.mm$^2$ and about 1.5 kgf.mm$^2$.

11. A method of fabricating a multi-material coated optical fiber, the coating comprising a plurality of materials, the method comprising the steps of:

coating a mid-portion of the optical fiber with a first material; and coating a first end portion of the optical fiber adjacent to the mid-portion with a second material after coating the mid-portion;

wherein the second material has a lower Young's modulus than that of the first material.

12. The method of fabricating a multi-material coated optical fiber of claim 11, the method further comprising the steps of:

coating a second end portion of the optical fiber with the second material before coating the mid-portion, the second end portion adjacent to the mid-portion on an end opposite the first end portion.

13. The method of fabricating a multi-material coated optical fiber of claim 12 wherein the coating materials are such that the interfacial shearing stress for the multi-material coated fiber is less than the interfacial shearing stress for a substantially like fiber coated with only one material of the multi-material coated fiber to substantially the same thickness as the multi-material coating.

14. The method of fabricating a multi-material coated optical fiber of claim 13 wherein the coating materials satisfy the following equation:

$$\left[\frac{k}{2\pi r_o}\left(\frac{\alpha \Delta t}{\lambda} - \hat{T}\right)\right]_{multi-material} < \left[\frac{k}{2\pi r_o}\left(\frac{\alpha \Delta t}{\lambda} - \hat{T}\right)\right]_{single\ material}$$

wherein $$k = \sqrt{2\pi r_o \frac{\lambda}{\kappa}},$$

$\alpha$ is the coefficient of thermal expansion, $\Delta t$ is the temperature change, $\lambda$ is the axial compliance of the coating material, $\kappa$ is the coefficient of longitudinal interfacial compliance, $r_0$ is the radius of the optical fiber, $\hat{T}$ is the thermally induced force at a boundary of dissimilar coating materials and the bracketed quantities are the interfacial shearing stress.

15. The method of fabricating a multi-material coated optical fiber of claim 13 wherein the coating materials are such that the percent interfacial shearing stress relief gained by employing the multi-material coating as compared to a coating comprising only one of the materials, wherein both coatings are applied to substantially the same thickness and to substantially like fibers, is in the range of about 40% to about 60%.

16. The method of fabricating a multi-material coated optical fiber of claim 11 wherein the Young's modulus of the first material is in the range of about $0.2 \times 10^6$ psi to about $1.0 \times 10^6$ psi, and the Young's modulus of the second material is in the range of about $0.02 \times 10^6$ psi to about $0.1 \times 10^6$ psi.

17. The method of fabricating a multi-material coated optical fiber of claim 11 wherein:

the first material is one from the group consisting of polymeric materials having a Young's modulus of about $0.2 \times 10^6$ psi or higher; and the second material is one from the group consisting of polymeric materials having a Young's modulus of about $0.1 \times 10^6$ psi or lower.

18. The method of fabricating a multi-material coated optical fiber of claim 12 wherein the mid-portion material has a Young's modulus of about $0.2 \times 10^6$ psi or higher.

19. The method of fabricating a multi-material coated optical fiber of claim 12 wherein at least one end portion material has a Young's modulus of about $0.1 \times 10^6$ psi or lower.

20. The method of fabricating a multi-material coated optical fiber of claim 13 wherein the interfacial shearing stress is in the range of about 0.5 kgf/mm$^2$ to about 1.5 kgf/mm$^2$.

21. A telecommunications system comprising multi-material coated fibers according to claim 1.

22. A method of fabricating a telecommunications system, the system having multi-material coated fibers, wherein the multi-material coated fibers are fabricated according to the method of claim 11.

* * * * *